United States Patent
Heidtmann et al.

(10) Patent No.: US 10,556,686 B2
(45) Date of Patent: Feb. 11, 2020

(54) CABIN MONUMENT FOR AN AIRCRAFT

(71) Applicant: Airbus Operations GmbH, Hamburg (DE)

(72) Inventors: Andreas Heidtmann, Hamburg (DE); Thorsten Otto, Hamburg (DE); Markus Schumacher, Hamburg (DE); Martin Staub, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 15/792,201

(22) Filed: Oct. 24, 2017

(65) Prior Publication Data

US 2018/0118347 A1  May 3, 2018

(30) Foreign Application Priority Data

Oct. 26, 2016 (DE) ........................ 10 2016 221 111

(51) Int. Cl.
*B64D 11/02* (2006.01)
*E04B 1/19* (2006.01)
*B64D 11/00* (2006.01)

(52) U.S. Cl.
CPC ................ *B64D 11/02* (2013.01); *E04B 1/19* (2013.01); *B64D 2011/0046* (2013.01); *E04B 2001/1957* (2013.01)

(58) Field of Classification Search
CPC ......... B64D 11/00; B64D 11/02; B64D 11/04; B61D 35/00; B61D 35/002; B61D 35/005; B61D 35/007; E04B 1/19; E04B 1/1906; E04B 1/2403; E04B 2001/1933; E04B 2001/1957; E04B 2001/2406; E04B 1/24; E04B 1/28
See application file for complete search history.

(56) References Cited

U.S. PATENT DOCUMENTS

| 3,042,158 A | * | 7/1962 | Michaels | ................ | F16B 12/50 |
| | | | | | 403/288 |
| 3,192,671 A | * | 7/1965 | Smith | ....................... | E04B 1/14 |
| | | | | | 52/281 |
| 3,196,993 A | * | 7/1965 | Holloman | ............. | E04B 1/2403 |
| | | | | | 52/276 |
| 3,623,287 A | * | 11/1971 | Force | .................... | E04B 1/2403 |
| | | | | | 52/280 |

(Continued)

FOREIGN PATENT DOCUMENTS

| DE | 29504286 U1 | 5/1995 |
| DE | 202006014046 U1 | 2/2008 |

(Continued)

OTHER PUBLICATIONS

German Search Report for German Application No. 102016221111 dated Jun. 2, 2017.

*Primary Examiner* — Joseph W Sanderson
(74) *Attorney, Agent, or Firm* — Jenkins, Wilson, Taylor & Hunt, P.A.

(57) ABSTRACT

A cabin monument for an aircraft. The cabin monument has a framework with a base frame and a frame structure connected to the base frame, and side walls fastened to the frame structure. By fastening the side walls to the structural struts of the frame structure, a mechanical load acting on the cabin monument is distributed between the framework and the side walls.

11 Claims, 5 Drawing Sheets

(56) References Cited

U.S. PATENT DOCUMENTS

| | | | | |
|---|---|---|---|---|
| 3,648,920 A | * | 3/1972 | Stump | B65D 5/5033 229/199 |
| 3,854,259 A | * | 12/1974 | Lechene | E04B 1/6112 52/704 |
| 4,008,547 A | * | 2/1977 | Katzman | E04H 4/00 52/169.7 |
| 4,018,213 A | * | 4/1977 | Mann, Jr. | A01G 9/243 126/633 |
| 4,127,347 A | * | 11/1978 | Pritchard | E06B 3/9645 403/231 |
| 4,462,390 A | * | 7/1984 | Holdridge | A01G 9/243 126/587 |
| 4,596,093 A | * | 6/1986 | Esposito | A01G 9/227 52/86 |
| 4,689,930 A | * | 9/1987 | Menchetti | E04B 2/7409 52/275 |
| 4,782,637 A | * | 11/1988 | Eriksson | E04B 1/3483 312/111 |
| 5,150,863 A | | 9/1992 | Hozumi | |
| 5,467,562 A | * | 11/1995 | Holland | E04H 1/125 52/79.1 |
| 6,079,669 A | * | 6/2000 | Hanay | B64D 11/02 244/118.5 |
| 6,085,468 A | * | 7/2000 | Quiring | E04B 1/19 52/273 |
| 6,101,766 A | | 8/2000 | Mogensen | |
| 7,237,749 B2 | * | 7/2007 | Ritts | B61D 17/046 244/117 R |
| 7,712,270 B2 | * | 5/2010 | Guevremont | E04B 1/24 52/235 |
| 8,047,467 B2 | * | 11/2011 | Erickson | B64D 11/0015 244/118.1 |
| 8,245,467 B2 | * | 8/2012 | Lewis | B64D 11/00 52/282.3 |
| 8,393,575 B2 | * | 3/2013 | Perry | B29C 65/562 244/119 |
| 9,316,015 B1 | * | 4/2016 | Elliott | E04H 9/14 |
| 9,321,533 B2 | * | 4/2016 | Cuddy | B64C 1/1407 |
| 2006/0124802 A1 | | 6/2006 | Ritts et al. | |
| 2006/0156643 A1 | * | 7/2006 | Lin | E04B 1/24 52/79.1 |
| 2007/0125909 A1 | * | 6/2007 | Seiersen | B64D 11/00 244/118.5 |
| 2007/0227089 A1 | * | 10/2007 | Lewis | B64D 11/00 52/468 |
| 2008/0168735 A1 | * | 7/2008 | Guevremont | E04B 1/24 52/585.1 |
| 2009/0278429 A1 | | 11/2009 | Erickson et al. | |
| 2010/0095624 A1 | * | 4/2010 | Lewis | B64D 11/00 52/468 |
| 2010/0187355 A1 | * | 7/2010 | Guering | B64D 11/00 244/118.5 |
| 2013/0180182 A1 | * | 7/2013 | Yoo | E04B 1/3483 52/6 |
| 2013/0180190 A1 | * | 7/2013 | Bovet | E04B 1/24 52/220.1 |
| 2014/0196394 A1 | * | 7/2014 | Greeson | H05K 7/1497 52/404.2 |
| 2014/0355282 A1 | * | 12/2014 | Cuddy | B64C 1/1407 362/471 |
| 2015/0152634 A1 | * | 6/2015 | Unger | E04B 1/3483 52/79.2 |
| 2016/0024779 A1 | * | 1/2016 | Clus | E04B 1/19 52/79.1 |
| 2016/0176537 A1 | * | 6/2016 | Rodriguez | B64D 43/00 224/401 |
| 2016/0319534 A1 | * | 11/2016 | Bernardo | E04B 1/3483 |
| 2017/0022698 A1 | * | 1/2017 | Zacarias | E04B 1/24 |
| 2017/0204597 A1 | * | 7/2017 | McDonald | E04C 3/083 |
| 2018/0016014 A1 | * | 1/2018 | Burd | E05B 65/06 |

FOREIGN PATENT DOCUMENTS

| | | |
|---|---|---|
| FR | 2562178 A1 | 10/1985 |
| GB | 265089 A | 2/1927 |

* cited by examiner

CABIN MONUMENT FOR AN AIRCRAFT

CROSS-REFERENCE TO RELATED APPLICATION

This application claims priority to German Patent Application DE 10 2016 221 111.0 filed Oct. 26, 2016, the entire disclosure of which is incorporated by reference herein.

TECHNICAL FIELD

The present disclosure relates to a cabin monument for an aircraft.

BACKGROUND

In aircraft, the interior enclosed by the fuselage of the aircraft is usually subdivided.

In order to form enclosed spaces within the interior, what are known as cabin monuments are used. In this case, the cabin monuments are used in particular to house sanitary facilities, such as toilets, washbasins or the like, and are also used as storage spaces.

Usually, cabin monuments comprise a plurality of side walls that define an interior and are made of a composite material having a honeycomb structure, in order to ensure that the side walls have a high level of rigidity. The side walls are generally arranged edge to edge at the end faces and are directly screwed or bonded to one another at the end faces. In order to screw the side walls together, due to the honeycomb structure, inserts are usually provided to receive the screws in the honeycomb structure. During bonding, the honeycomb structure is generally filled with a filler at the end face in order to form an adhesion surface. Fittings are often used to stiffen the side walls.

SUMMARY

It is an idea of the present disclosure to provide a cabin monument that is improved in terms of rigidity and ease of installation.

This idea is realized according to the disclosure herein by a cabin monument for an aircraft that comprises a framework and a plurality of side walls. The framework comprises a base frame forming the periphery of a base surface of the cabin monument and a frame structure connected to the base frame. The frame structure comprises a plurality of structural struts extending from the base frame. The number of side walls of the cabin monument corresponds to the number of structural struts, the side walls each extending between two structural struts that are successive over the periphery, and being fastened thereto.

According to the disclosure herein, a cabin monument is therefore specified which comprises a framework defining a three-dimensional extension of the cabin monument, and comprises side walls fastened thereto. The framework in particular comprises a base frame which defines a base surface of the cabin monument. A frame structure comprising a plurality of in particular elongate structural struts or longitudinal supports is mechanically connected or fastened to the base frame. The base frame and the frame structure together define an interior of the cabin monument. The structural struts are arranged over the base frame, a side wall extending between two successive structural struts or longitudinal supports in each case, and being fastened thereto. Therefore, the framework forms a type of skeleton or supporting structure for the cabin monument. The framework thus significantly improves the mechanical rigidity of the cabin monument.

By fastening the side walls to the structural struts of the frame structure, a mechanical load acting on the cabin monument is efficiently distributed between the framework and the side walls. Therefore, the load on the individual components of the cabin is significantly reduced. This makes it possible to reduce the wall thicknesses, meaning that the weight of the cabin monument can be kept low at the same time. Fastening the side walls to the structural struts of the frame structure is also advantageous in that the structural struts provide a reliable fastening structure for attaching the side walls thereto. Therefore, the side walls do not need to be machined, as would otherwise be necessary for this purpose.

The base frame may in particular be constructed as a planar frame. Therefore, the base frame extends such that it forms a continuous plane.

Furthermore, the base frame may be formed by a plurality of frame struts that are fastened to one another. In this way, the base frame can be stored and transported in a space-saving manner before it is installed. Furthermore, in this way, modular construction of the cabin monument can be achieved.

According to a development, the base frame is configured or designed as a closed or continuously peripheral frame. This ensures high mechanical rigidity of the base frame.

According to another embodiment, the side walls are each configured or designed as sandwich panels comprising a core that has a hollow structure. The side walls therefore in particular comprise an inner panel, an outer panel and a core arranged between mutually opposing surfaces of the panels. The core forms cavities in the intermediate space extending between the surfaces of the panels. This can in particular be produced by a honeycomb-like, channel-like or similar structure of the core. It is also conceivable for the core to be made of a material forming a hollow structure, for example a foamed material or the like. Owing to the sandwich-like structure having a core forming a hollow structure, relatively high rigidity of the side walls relative to the weight thereof is achieved. Owing to the side walls being fastened to the frame structure, sandwich panels of this type can be installed as side walls without any particular machining in advance. The design of the side panels as sandwich panels, in combination with the panels being fastened to the framework, thus improves the mechanical stability of the cabin monument, with the cabin monument having a low weight and being easy to install.

According to another development of the cabin monument, the base frame forms the periphery of the base surface of the cabin monument so as to have at least two corners, and one of the structural struts of the frame structure extends from each of the corners of the base frame in each case. In particular, the base frame extends in a deviating, i.e. non-continuous, manner at at least two points over its periphery.

In particular if the base frame extends between two successive corners, this results in a space-saving structure of the cabin monument. In particular, the base frame may form the periphery of the base surface of the cabin monument so as to have four corners. This makes it possible to adapt the base surface of the cabin monument to a plurality of possible installation scenarios in a space-saving manner. The design of the base frame to have four corners in particular includes a rectangular base surface of the cabin monument. Here, the base frame extends in a straight line between two successive corners in each case. This makes it easier to install the cabin monument itself and to install accessory components on the cabin monument.

According to another embodiment, the structural struts provided at two successive corners defining a rear side of the base frame are each curved. Furthermore, these structural struts are each connected or coupled to the structural struts provided on a front side of the base frame, the front side being opposite the rear side. Therefore, the frame structure spans the base frame in an at least partially curved manner between opposing sides of the base frame. The rear structural struts are in particular coupled to the front structural struts in the region of end portions thereof that are positioned opposite the base frame. In this case, the front and rear structural struts can be directly fastened to one another and thus can be directly interconnected.

As an alternative, a transverse strut, which is described in greater detail in the following and extends between the front structural struts, may be provided, to which the rear, curved structural struts are fastened. In this way, the curved structural struts are indirectly connected to the front structural struts by the transverse strut. A particularly space-saving arrangement of the cabin monument in a cylindrical fuselage can be achieved by the curved design of the structural struts provided at corners defining the rear of the base frame. Furthermore, the mechanical rigidity of the framework can be significantly increased by coupling the structural struts provided at the front and the rear.

The structural struts provided on the front side may in particular each be provided at corners. Here, the front structural struts are each arranged at corners formed by the base frame. In a design in which the base frame has four corners, two corners thus define the rear of the base frame and two corners opposite the corners define the front of the base frame. Here, in particular for a rectangular design of the base frame, a framework having high mechanical strength is provided in a space-saving manner.

According to another embodiment, the frame structure additionally comprises at least one transverse strut, and these each extend between two structural struts. In particular, the at least one transverse strut extends between two successive structural struts. This further increases the mechanical strength of the framework. Furthermore, the transverse struts form additional fastening structures for the side walls.

As already described above, the potentially provided, curved structural struts may be connected or fastened to a transverse strut extending between the structural struts provided on the front side of the base frame.

According to another development of the cabin monument, the structural struts and/or the base frame are configured or designed as hollow profiled parts. The structural struts therefore have a hollow cross section. Alternatively or additionally, the base frame, and optionally the frame struts forming the base frame, may also be designed to have a hollow cross section. Hollow profiled parts are advantageous in that they have a low weight while having high rigidity.

In particular, the structural struts and/or the base frame may be designed to have a triangular or trapezoidal cross section. In particular when arranging the structural struts at corners of the base frame, advantageously stable fastening surfaces are provided by the arm surfaces of the triangular or trapezoidal profiles.

The structural struts and/or the base frame may in particular comprise a metal material, for example an aluminum or titanium material, and in particular may be made of such a material. Metals, in particular based on aluminum or titanium, have high mechanical strength relative to their weight.

According to an embodiment of the cabin monument, the side walls are each connected to the structural struts by a connector. Connecting devices such as screws, rivets, pins or the like may in particular be provided as connector. As an alternative, an adhesive may also be provided as the connector. In particular, a plurality of screws that penetrate the side walls and protrude into the respective structural struts may be provided in the longitudinal extension of one of the structural struts in each case. By screwing the side walls to the structural struts, the side walls are advantageously fastened to the structural struts in a reliable manner and such that they can be easily and rapidly installed. Furthermore, detachable fastening is provided by the screw connection, such that the cabin monument can advantageously be removed without being destroyed.

According to a development, the side walls abut one another at the structural struts such that they form a miter joint. Therefore, the side walls abut one another at mutually opposing end faces, the end faces having a bevel relative to the main surfaces of the side walls. In particular when arranging the structural struts at corners of the base frame, this design is advantageous since open end faces of the side walls are prevented in this case. Therefore, there is no need for covers or for the hollow structure of the core to potentially be filled.

According to another embodiment, the structural struts each comprise a support part and a clamping part and the side walls ending at the relevant structural strut are clamped between the support part and the clamping part. Here, the side walls are therefore clamped between two mutually opposing clamping surfaces of the relevant structural strut and are thus fastened thereto. This ensures that the side walls can be fastened in a reliable manner and such that they can be easily installed. In particular, no additional machining of the side walls is required.

The support part is designed in particular as an elongate component, for example as a component that defines the total length of the structural strut. The clamping part is connected to the support part. This can be implemented in particular by the support part and the clamping part being configured or designed as separate components that are detachably interconnected, in particular screwed to one another. This is advantageous in that the structural struts can be used for side walls that have different wall thicknesses. This broadens the range of possible applications of the cabin monument. As an alternative, the clamping part and the support part may also be formed in one piece. It is in particular conceivable here, in at least one of the structural struts, for the support part and the clamping part to be configured or designed as separate components that are detachably interconnected. Owing to the one-piece design, the number of components of the cabin monument is advantageously reduced. Furthermore, an additional step for connecting the support part and clamping part is not required during installation of the cabin monument.

According to another development of the cabin monument, the clamping part extends over at least 50 percent of the longitudinal extension of the support part. This results in planar clamping of the side wall between the support part and the clamping part, and this improves the mechanical resistance of the connection.

In particular, the clamping part may extend over at least 90 percent of the longitudinal extension of the support part and for example the clamping part and the support part may have an identical longitudinal extension. As a result, clamping is provided substantially over the entire length of the side wall. This produces a visually appealing connection between the side wall and the structural strut, without any additional machining of the side wall being required for this purpose.

In order to improve the mechanical strength of the connection between the structural strut and the side wall, an adhesive layer may be provided on at least one of the clamping surfaces formed on the clamping part and the support part. Alternatively or additionally, studs or the like may be provided on the clamping surfaces which are pressed into the surfaces when clamping the side walls.

According to another embodiment, the support part is configured or designed as a hollow profiled part. Hollow profiled parts are advantageous in that they have a low weight while having high rigidity.

In particular, the support part may be designed to have a triangular or trapezoidal cross section. In particular when arranging the structural struts at corners of the base frame, advantageously large clamping surfaces are provided by the arm surfaces of the triangular or trapezoidal profiles. Here, the clamping part may be constructed as a corner profile, for example having an L-shaped or V-shaped cross section.

The support part and/or the clamping part of the structural struts may in particular comprise a metal material, for example an aluminum or titanium material, and in particular may be made of the material. Metals, in particular based on aluminum or titanium, have high mechanical strength relative to their weight.

According to another aspect of the present disclosure, an aircraft comprising a fuselage, an internal floor that extends in an interior of the aircraft that is defined by the fuselage, and a cabin monument according to one of the above-described embodiments is provided. In this case, the base frame of the cabin monument is arranged on the internal floor.

Another aspect of the present disclosure relates to a use of a cabin monument according to one of the above-described embodiments as a housing for a bathroom in an aircraft. Since the cabin monument has particularly high rigidity or inherent stability due to the framework, a relatively large cabin monument can advantageously be provided. This gives the user good freedom of movement within the bathroom.

Here, a corner can generally be understood in particular as a non-continuous course of a structure.

Where "one-piece", "single-piece", "integral" components or components "in one piece" are mentioned, these should generally be taken as being present as a single part forming a material unit, and in particular as having been produced as such, it being impossible to detach one component from the other without destroying the material bond.

In this document, where directional details and axes are concerned, in particular directional details and axes relating to the course of physical structures, a course of an axis, direction or structure "along" another axis, direction or structure should be taken to mean that these, in particular the tangents produced at a given point on the structures, extend in each case at an angle of less than 45° to one another, for example less than 30°, and for example in parallel with one another.

In this document, where directional details and axes are concerned, in particular directional details and axes relating to the course of physical structures, a course of an axis, direction or structure "transversely to" another axis, direction or structure should be taken to mean that these, in particular the tangents produced at a given point on the structures, extend in each case at an angle of greater than or equal to 45° to one another, for example greater than or equal to 60°, and for example perpendicularly to one another.

BRIEF DESCRIPTION OF THE DRAWINGS

The disclosure herein will be described hereinafter with reference to the example figures of the drawings, in which.

In the drawings, the same reference numerals denote like or functionally like components, unless specified otherwise.

DETAILED DESCRIPTION

Figure 1:
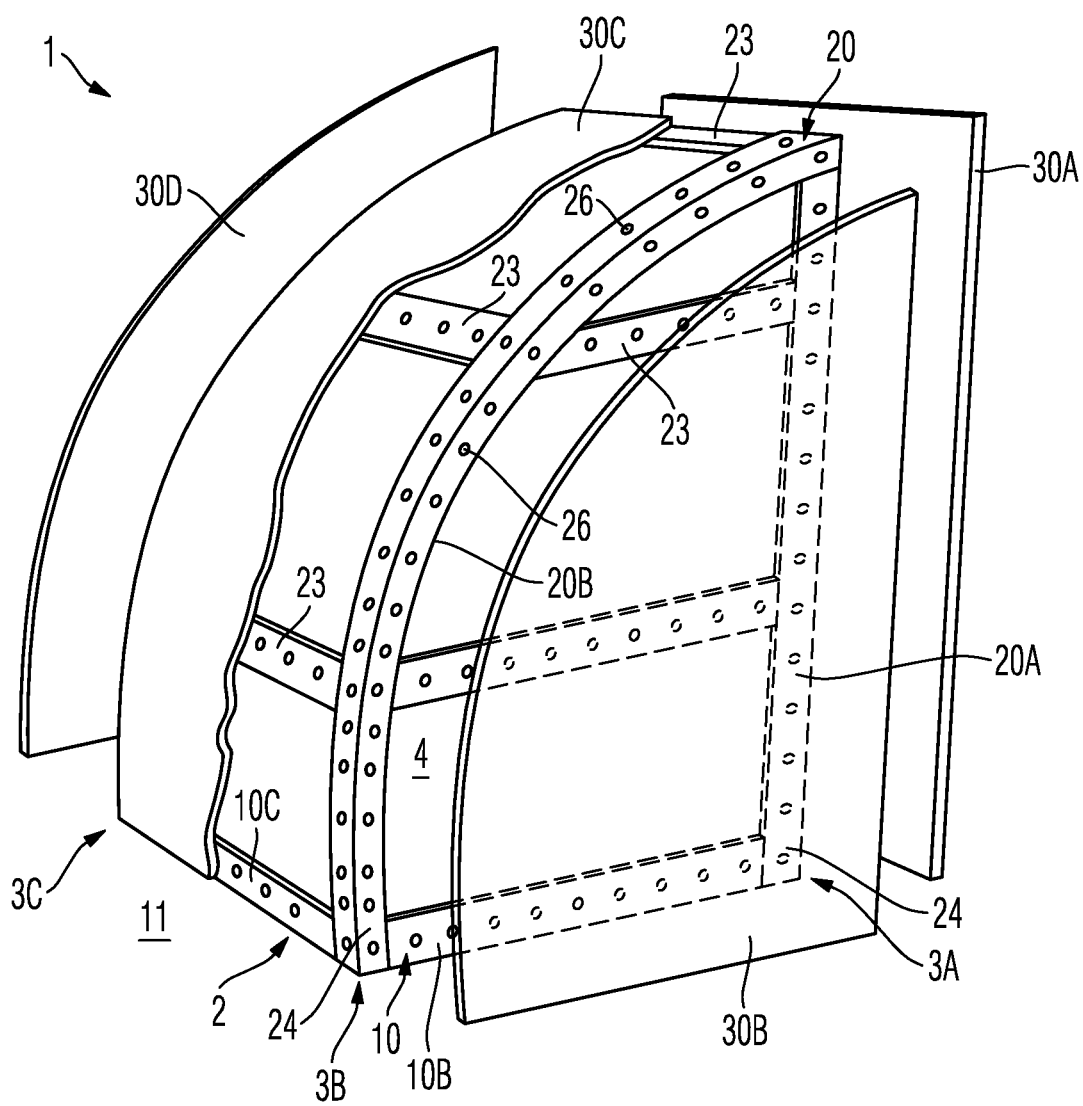
FIG. 1 is a perspective exploded view of a cabin monument according to an embodiment of the present disclosure.
Figure 3:
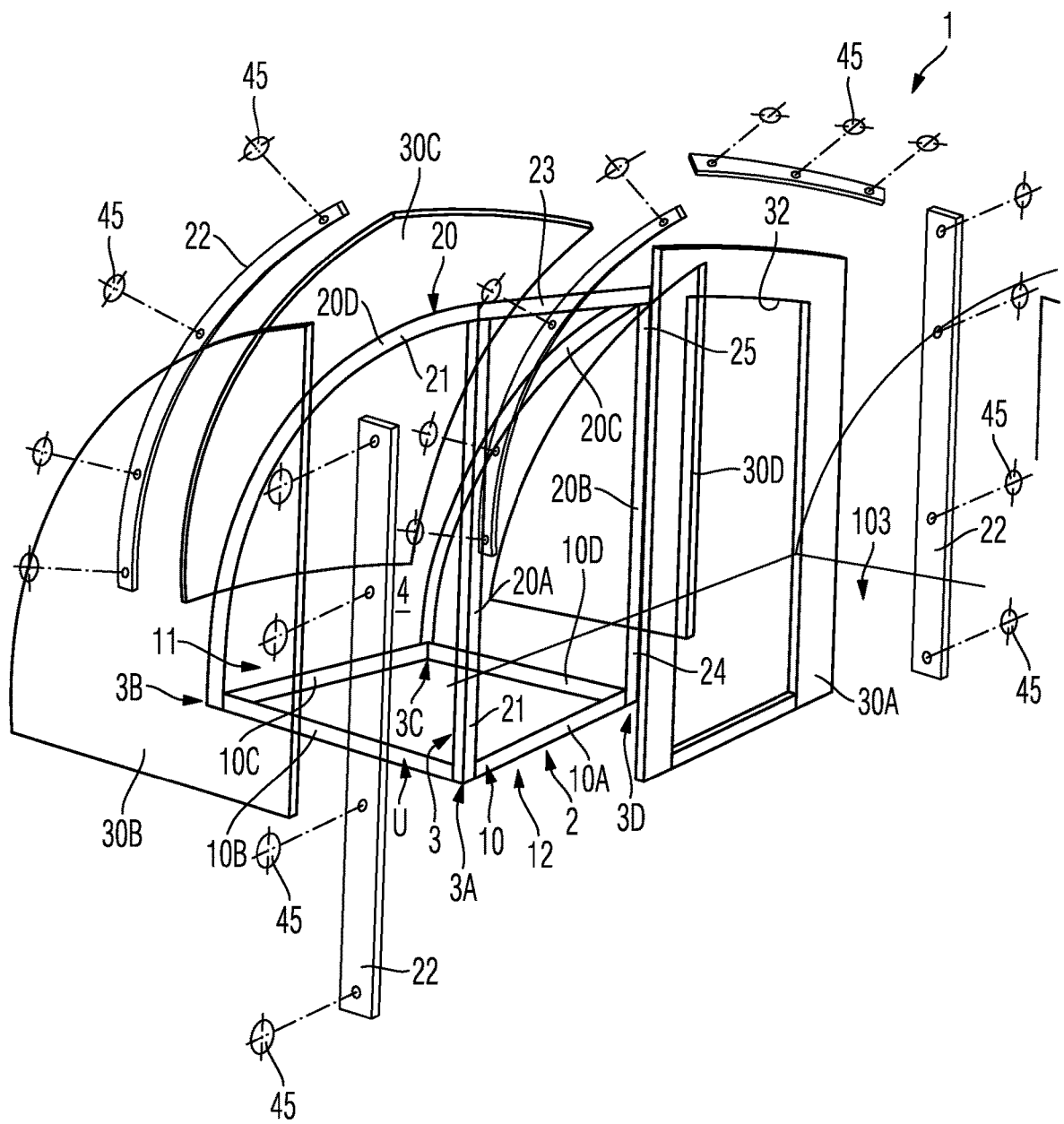
FIG. 3 is a perspective exploded view of a cabin monument according to another embodiment of the present disclosure.

FIGS. 1 and 3 each show a cabin monument 1 for an aircraft 100. The cabin monument 1 comprises a framework 2 and a plurality of side walls 30A, 30B, 30C, 30D. As shown in each of FIGS. 1 and 3, the framework 2 comprises a base frame 10 and a frame structure 20. The base frame 10 forms the periphery U of a base surface 3 of the cabin monument 1. In FIGS. 1 and 3, the base frame 10 for example forms the periphery U of a rectangular base surface 3 of the cabin monument 1. Because of the perspective of the view in FIG. 1, only three of the four corners 3A, 3B, 3C, 3D of the base surface 3 are visible. As also shown in FIGS. 1 and 3, the base frame 10 may in particular comprise a plurality of interconnected frame struts 10A, 10B, 10C, 10D. By way of example, FIGS. 1 and 3 show the base frame 10 as a closed frame that defines the base surface 3.

As also shown in FIGS. 1 and 3, the frame structure 20 and the base frame 10 are interconnected or fastened to one another, and together form an interior 4 of the cabin monument 1. In particular, the framework 2 thus defines the three-dimensional extension or design of the cabin monument 1.

As shown in FIGS. 1 and 3, the frame structure 20 comprises a plurality of structural struts 20A, 20B, 20C, 20D extending from the base frame 10, and optionally provided transverse struts 23. These are each connected to the base frame 10 by a first end portion 24, for example screwed, riveted, welded or bonded thereto, or the like. As can be seen in particular from FIG. 1, the frame struts 10A, 10B, 10C, 10D of the base frame 10 may in particular each extend between two successively arranged structural struts 20A, 20B, 20C, 20D of the frame structure 20. The structural struts 20A, 20B, 20C, 20D are therefore provided at or form the corners 3A, 3B, 3C, 3D.

As shown by way of example in FIGS. 1 and 3, the structural frame 20 comprises a curved, rear structural strut 20B, 20C at two successive corners 3B, 3C. The corners 3B, 3C at which the curved structural struts 20B, 20C are provided together define a rear side 11 of the base frame. The curved structural struts 20B, 20C are each connected to the base frame by their first end portions 24. The curved, rear structural struts 20B, 20C are each connected to the structural struts 20A, 20D provided on a front side 12 of the base frame 10. As shown in FIGS. 1 and 3, the front side 12 is opposite the rear side 11. In particular, the front side 12 is defined by the corners 3A, 3D. The curved structural struts 20B, 20C are connected to the structural struts 20A, 20D arranged on the front side 12. In particular, the curved structural struts 20B, 20C may each be connected to a second end portion 25 of the front structural struts 20A, 20D by a second end portion 25 that is opposite the first end portion 24 in terms of its longitudinal extension. As shown by way of example in FIGS. 1 and 3, the front structural struts 20A, 20D may be configured or designed as straight spars.

As also shown in FIGS. 1 and 3, the optional transverse struts 23 each extend between two structural struts 20A, 20B, 20C, 20D that are successive over the base frame 10. By way of example, FIG. 1 shows two transverse struts 23 extending between the front structural strut 20A and the rear structural strut 20B, and shows two transverse struts 23 extending between the curved, rear structural struts 20B, 20C. By way of example, in FIG. 3 just one transverse strut 23 extending between the front structural struts 20A, 20D, in particular between the end portions 25 thereof, is provided.

FIGS. 1 and 3 also schematically show that the number of side walls 30A, 30B, 30C, 30D corresponds to the number of structural struts 20A, 20B, 20C, 20D. Therefore, in the cabin monuments 1 that are shown schematically and by way of example in each of FIGS. 1 and 3, four side walls 30A, 30B, 30C, 30D are provided in each case. The side walls 30A, 30B, 30C, 30D each extend between two structural struts 20A, 20B, 20C, 20D that are successive over the periphery U or the base frame 10, and are fastened thereto. As shown in FIG. 3, at least one of the side walls 30A, 30B, 30C, 30D may comprise a cut-out 32. The cut-out 32 forms an access opening to the interior 4 of the cabin monument 1, and can for example be closed or opened by a door (not shown) that can be mounted on the cabin monument 1. The side walls 30A, 30B, 30C, 30D are each configured or designed as flat components extending in a planar manner.

Figure 2:
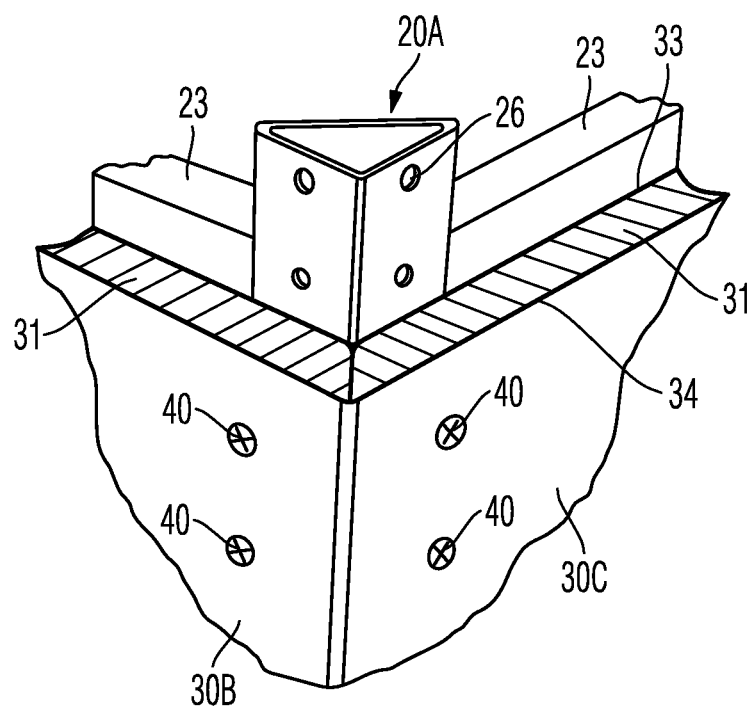
FIG. 2 is a discontinuous view of a detail of the fastening of side walls of the cabin monument shown in FIG. 1 to a structural strut.
Figure 4:
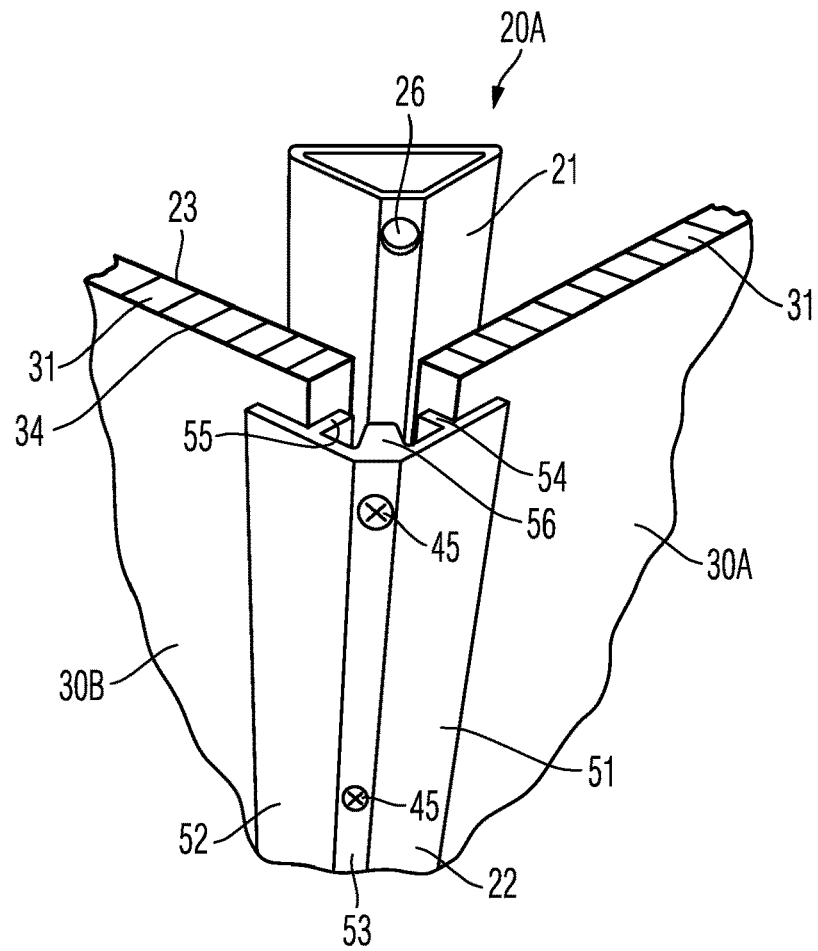
FIG. 4 is a discontinuous view of a detail of the fastening of side walls of the cabin monument shown in FIG. 3 to a structural strut.
Figure 5:
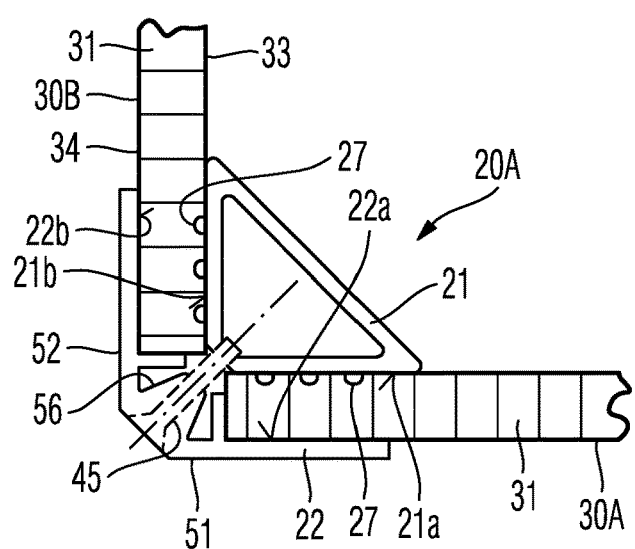
FIG. 5 is a sectional view of the fastening of side walls of the cabin monument shown in FIG. 3 to the structural strut.

As shown by way of example in FIGS. 2, 4 and 5, the side walls 30A, 30B, 30C, 30D are each designed in particular as sandwich panels comprising a core 31 that has a hollow structure. By way of example, FIGS. 2, 4 and 5 show the core 31 as a honeycomb structure. The core 31 may in particular be arranged between an inner cover panel 33 and an outer cover panel 34, as shown schematically in FIGS. 2, 4 and 5.

FIG. 2 is a schematic, perspective, sectional, discontinuous view of a detail of the cabin monument 1, for example of the cabin monument 1 shown in FIG. 1, in the region of a structural strut 20A, 20B, 20C, 20D. As shown by way of example in FIG. 2, the side walls 30A 30B 30C, 30D may each be fastened to the structural struts 20A, 20B, 20C, 20D by screws 40. Here, the screws 40 extend through the side walls 30A, 30B, 30C, 30D and may be screwed, by an end region, into respective threaded cut-outs 26 formed in the structural struts 20A, 20B, 20C, 20D.

As can be seen in FIG. 2, the structural struts 20A, 20B, 20C, 20D may in particular be configured or designed as hollow profiled parts having a triangular cross section. As also shown in FIG. 2, the side walls 30A, 30B, 30C, 30D each abut one another at the structural struts 20A, 20B, 20C, 20D at angled end faces, i.e. in the form of a miter joint. As can be see in FIG. 2, the core 31 is prevented from being visible in a simple manner.

As an alternative to screwing the side walls 30A, 30B, 30C, 30D to the structural struts 20A, 20B, 20C, 20D, the side walls 30A, 30B, 30C, 30D may also be clamped to the structural struts 20A, 20B, 20C, 20D in order to be fastened thereto, as shown schematically in FIGS. 3 through 5. In this case, the structural struts 20A, 20B, 20C, 20D each comprise a support part 21 and a clamping part 22. As shown in particular in FIG. 3, the support part 21 is configured or designed as an elongate, strut-like component. For example, the clamping part 22 is also configured or designed as an elongate, strut-like component. For example, the support part 21 and the clamping part 22 each have substantially the same length or longitudinal extension, as shown by way of example in FIG. 3. In particular, the clamping part 22 may extend over at least 50 percent of the longitudinal extension of the support part 21.

As shown in particular in FIG. 5, a support-part clamping surface 21a, 21b is formed on the support part 21 and a clamping-part clamping surface 22a, 22b is formed on the clamping part 22, the support-part clamping surface 21a, 21b and the clamping-part clamping surface 22a, 22b being oriented such that they face one another. The side walls 30A, 30B, 30C, 30D ending at the relevant structural strut 20A, 20B, 20C, 20D are each clamped between the support-part clamping surface 21a, 21b and the clamping-part clamping surface 22a, 22b, and as a result are fastened to the relevant structural strut 20A, 20B, 20C, 20D. As shown by way of example in FIG. 5, the support-part clamping surface 21a, 21b may be formed by a first partial clamping surface 21a and a second partial clamping surface 21b. Furthermore, the clamping-part clamping surface 22a, 22b may be formed by a first partial clamping surface 22a and a second partial clamping surface 22b. Here, the first partial clamping surface 21a of the support part 21 faces the first partial clamping surface 22a of the clamping part 22. In addition, the second partial clamping surface 21b of the support part 21 faces the second partial clamping surface 22b of the clamping part 22. In order to fasten the side walls 30A, 30B, 30C, 30D, an end portion of a first side wall ending at the relevant structural strut 20A, 20B, 20C, 20D is clamped between the first partial clamping surfaces 21a, 22a, and an end portion of another first side wall ending at the structural strut 20A, 20B, 20C, 20D is clamped between the second partial clamping surfaces 21b, 22b. According to the view shown by way of example in FIG. 5, the end portion of the side wall 30A is clamped between the first partial clamping surfaces 21a, 22a, and the end portion of the side wall 30B is clamped between the second partial clamping surfaces 21b, 22b.

As shown in particular in FIG. 5, the support part 21 may in particular be configured or designed as a hollow profiled part having a trapezoidal cross section. Here, the partial clamping surfaces 21a, 21b of the support part 21 are provided on the sides of the hollow profiled part which connect the sides of the trapezoidal cross section that extend along one another, in particular in parallel with one another. Furthermore, raised portions or studs 27 may be provided on the support-part clamping surface 21a, 21b and are pressed into the cross section of the side wall 30A, 30B, 30C, 30D when clamping the wall.

FIGS. 4 and 5 also show a design of the clamping part 22 by way of example. In general, the clamping part 22 comprises the clamping-part clamping surface 22a, 22b, the clamping-part clamping surface 22a, 22b for example being formed so as to be complementary to the support-part clamping surface 21a, 21b. In particular, as shown by way of example in FIGS. 4 and 5, the clamping part 22 may be configured or designed as a substantially L-shaped, elongate angular profiled part comprising a first plate 51 and second plate 52 extending transversely thereto. The first and the second plates 51, 52 of the clamping part 22 are interconnected in a connection region 53, it being possible for the connection region 53 to in particular have an extension that extends at an angle to each of the plates 51, 52, as shown by way of example in FIGS. 4 and 5. In this case, the first partial clamping surface 22a of the clamping part 22 is formed on the first plate 51, and the second partial clamping surface 22b of the clamping part 22 is formed on the second plate 52. The clamping part 22 also comprises a first rib 54 and a second rib 55. The first rib 54 is provided on the first plate 51, the first rib 54 defining the first partial clamping surface 22a and projecting therefrom. The second rib 55 is provided on the second plate 52, the second rib 55 defining the second partial clamping surface 22b and projecting therefrom. A third rib 56 may also be provided in the connection region 53, which extends on the side of the partial clamping surfaces 22a, 22b. As an alternative or in addition to the raised portions or studs 27 optionally provided on the support-part clamping surface 21a, 21b, raised portions or studs (not shown) may also be provided on the clamping-part clamping surface 22a, 22b.

As shown by way of example in FIGS. 4 and 5, the support part 21 and the clamping part 22 may each be configured or designed as separate components. By way of example, FIGS. 4 and 5 show the fastening of the clamping part 22 to the support part 21 by screws 45. Here, as shown by way of example in FIG. 5, the screws 45 extend through the clamping part 22 and may be screwed, by an end region, into respective threaded cut-outs 26 formed in the support part 21. As shown by way of example in FIG. 5, the screw 45 extends in particular in the region of the connection region 53 and for example through the third rib 56. In FIG. 3, the screws 45 are only shown schematically by circles.

Figure 6:
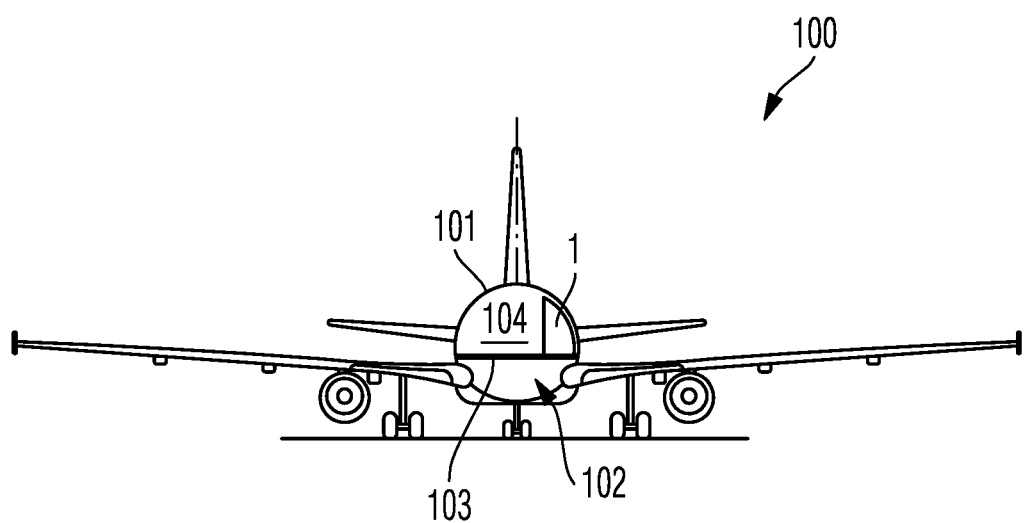
FIG. 6 shows an aircraft according to an embodiment of the present disclosure, a fuselage of the aircraft being shown in a sectional view.

By way of example, FIG. 6 shows an aircraft 100 comprising a fuselage 101, with the fuselage 101 being in a sectional vie n internal floor 103, and the cabin monument 1. The fuselage 101 defines an interior 102 of the aircraft 100 in which the internal floor 103 extends. For example, internal floor 103 forms a sub-interior 104 together with the fuselage 101. The sub-interior 104 may for example comprise a passenger cabin of the aircraft 100. The cabin monument 1 is arranged on the internal floor 103. In particular, the base frame 10 of the cabin monument 1 is arranged on the internal floor 103. The rear side 11 of the base frame 1 may be arranged so as to be attached to the fuselage 101. As can be seen in FIG. 6, excellent use of space in the interior 102 and the sub-interior 104 is ensured by the curved design of the rear structural struts 20B 20D. The cabin monument 1 for example forms a housing for a bathroom in the aircraft 100.

Although the present disclosure has been explained by way of example above on the basis of embodiments, it is not limited thereto; instead it can be modified in many different ways. In particular, combinations of the above embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabin monument for an aircraft, comprising:
    a framework comprising a base frame forming a periphery of a base surface of the cabin monument and a frame structure connected to the base frame, wherein the frame structure comprises a plurality of structural struts extending from the base frame; and
    a plurality of side walls, wherein the side walls each extend between two structural struts that are successive over the periphery and are fastened thereto,
    wherein structural struts provided at two successive corners defining a rear side of the base frame are each curved and are each directly connected to structural struts provided on a front side of the base frame, wherein the front side is opposite the rear side,
    wherein the structural struts each comprise a support part on an interior side of the monument and a clamping part on an exterior side of the monument wherein the support part and the clamping part are connected by fasteners, and the side walls are clamped between the support part and the clamping part,
    wherein the clamping part is configured as a hollow profiled part with a trapezoidal cross section, and
    wherein the side walls are each configured as sandwich panels comprising a core that has a hollow structure.

2. The cabin monument of claim 1, wherein the base frame forms the periphery of the base surface of the cabin monument to have at least two corners, and one of the structural struts of the frame structure extends from each of the corners of the base frame in each case.

3. The cabin monument of claim 2, wherein the base frame forms the periphery of the base surface of the cabin monument to have four corners.

4. The cabin monument of claim 1, wherein the structural struts provided on the front side are each provided at corners.

5. The cabin monument of claim 1, wherein the frame structure additionally comprises at least one transverse strut, which extends between two structural struts.

6. The cabin monument of claim 1, wherein the base frame is configured as a hollow profiled part.

7. The cabin monument of claim 6, wherein the base frame has a triangular cross section.

8. The cabin monument of claim 6, wherein the base frame has a trapezoidal cross section.

9. The cabin monument of claim 1, wherein the clamping part extends over at least 50 percent of a longitudinal extension of the support part.

10. An aircraft comprising:
    a fuselage;
    an internal floor that extends in an interior of the aircraft that is defined by the fuselage; and
    a cabin monument comprising a framework comprising a base frame forming a periphery of a base surface of the cabin monument and a frame structure connected to the base frame, wherein the frame structure comprises a plurality of structural struts extending from the base frame, and a plurality of side walls corresponding to the plurality of structural struts, the side walls each extending between two structural struts that are successive over the periphery and are fastened thereto;

wherein the base frame of the cabin monument is arranged on the internal floor, and wherein structural struts provided at two successive corners defining a rear side of the base frame are each curved and are each directly connected to structural struts provided on a front side of the base frame, wherein the front side is opposite the rear side, wherein the structural struts each comprise a support part on an interior side of the monument and a clamping part on an exterior side of the monument wherein the support part and the clamping part are connected by fasteners, and the side walls are clamped between the support part and the clamping part, wherein the clamping part is configured as a hollow profiled part with a trapezoidal cross section, and wherein the side walls are each configured as sandwich panels comprising a core that has a hollow structure.

11. The cabin monument of claim 10, wherein the cabin monument is used as a housing for a bathroom.

\* \* \* \* \*